United States Patent
Ito et al.

(10) Patent No.: US 9,114,430 B2
(45) Date of Patent: Aug. 25, 2015

(54) PIEZOELECTRIC VALVE, AND OPTICAL PARTICULATE MATTER SORTER PROVIDED WITH AIR-BLOWING MEANS THAT USES PIEZOELECTRIC VALVE

(71) Applicants: SATAKE CORPORATION, Tokyo (JP); MECHANO TRANSFORMER CORPORATION, Kawasaki-shi, Kanagawa (JP)

(72) Inventors: Takafumi Ito, Hiroshima (JP); Teruhiko Takeuchi, Hiroshima (JP); Tadashi Matsushita, Hiroshima (JP); Sze Keat Chee, Kawasaki (JP); Takeshi Yano, Kawasaki (JP); Takeshi Kamima, Asahi (JP); Toshiro Higuchi, Tokyo (JP)

(73) Assignees: SATAKE CORPORATION, Tokyo (JP); MECHANO TRANSFORMER CORPORATION, Tokyo (JP)

( * ) Notice: Subject to any disclaimer, the term of this patent is extended or adjusted under 35 U.S.C. 154(b) by 0 days.

(21) Appl. No.: 14/395,475

(22) PCT Filed: Apr. 16, 2013

(86) PCT No.: PCT/JP2013/061300
§ 371 (c)(1),
(2) Date: Oct. 18, 2014

(87) PCT Pub. No.: WO2013/157548
PCT Pub. Date: Oct. 24, 2013

(65) Prior Publication Data
US 2015/0060337 A1 Mar. 5, 2015

(30) Foreign Application Priority Data
Apr. 20, 2012 (JP) .................................. 2012-096605

(51) Int. Cl.
*F16K 31/00* (2006.01)
*B07B 11/02* (2006.01)
(Continued)

(52) U.S. Cl.
CPC . *B07B 11/02* (2013.01); *B07B 4/00* (2013.01); *B07B 11/04* (2013.01); *F16K 31/004* (2013.01); *F16K 31/007* (2013.01)

(58) Field of Classification Search
CPC ..... F16K 31/02; F16K 31/004; B07C 5/3425; B07C 5/366; B07C 5/342; B07C 5/3422; B07C 5/365; B07C 11/00; B07C 2501/009
USPC ........... 251/129.01, 129.06, 129.07; 209/587, 209/580, 644, 639
See application file for complete search history.

(56) References Cited

U.S. PATENT DOCUMENTS 5,628,411 A * 5/1997 Mills et al. ..................... 209/644
7,355,320 B2 * 4/2008 Finley ........................... 310/311
(Continued)

FOREIGN PATENT DOCUMENTS

JP   H07-107372 B    11/1995
JP   2004-316835 A   11/2004
JP   2011-241961 A   12/2011

*Primary Examiner* — Patrick Cicchino
(74) *Attorney, Agent, or Firm* — Orion Consulting, Ltd.; Joseph P. Farrar (57) ABSTRACT

A piezoelectric valve stably supplies gas even for a long gas ejection time, with a high responsivity to opening the valve, is provided. The piezoelectric valve, including a gas-pressure-chamber for receiving a compressed gas supplied from outside, a gas-discharge-channel through which the compressed gas is discharged from the gas-pressure-chamber, comprises: a valve body disposed in the gas-pressure-chamber and opens/closes the gas-discharge-channel; a piezoelectric element for producing a driving force to move the valve body as a displacement; a displacement-enlarging-mechanism for enlarging the displacement of the piezoelectric element to act on the valve body; and a driving unit having a signal-generating-unit for generating a signal comprising a pre-pulse and a main pulse and provides the signal generated by the signal-generating-unit to a driving circuit as an input signal to apply a driving voltage to the piezoelectric element to make the piezoelectric element expand and drive the valve body open.

5 Claims, 10 Drawing Sheets

(51) Int. Cl.
B07B 4/00 (2006.01)
B07B 11/04 (2006.01)

(56) References Cited

U.S. PATENT DOCUMENTS

| | | | |
|---|---|---|---|
| 7,360,750 B2* | 4/2008 | Yano et al. | 251/129.07 |
| 8,436,268 B1* | 5/2013 | Afsari et al. | 209/581 |
| 8,662,312 B2* | 3/2014 | Ito et al. | 209/552 |
| 2004/0206409 A1* | 10/2004 | Yano et al. | 137/883 |
| 2005/0151445 A1* | 7/2005 | Titschert et al. | 310/316.03 |
| 2007/0018534 A1* | 1/2007 | Sciortino et al. | 310/316.01 |
| 2011/0108126 A1* | 5/2011 | Monkowski et al. | 137/12 |
| 2013/0299725 A1* | 11/2013 | Deperraz | 251/129.01 |
| 2014/0339141 A1* | 11/2014 | Ito et al. | 209/552 |

* cited by examiner

PIEZOELECTRIC VALVE, AND OPTICAL PARTICULATE MATTER SORTER PROVIDED WITH AIR-BLOWING MEANS THAT USES PIEZOELECTRIC VALVE

TECHNICAL FIELD

The present invention relates to a piezoelectric valve that is opened and closed by expansion/compression displacement of a piezoelectric element, a method of driving the piezoelectric valve, and an optical particulate matter sorter provided with an air ejecting unit incorporating the piezoelectric valve.

BACKGROUND ART

A known conventional optical particulate matter sorter has a unit for ejecting air to separate grains, such as cereal grains or resin pellets, into non-defective grains (desired grains) and defective grains (unwanted grains) or remove foreign matters from the grains.

The particulate matter sorter of this type separates grains by activating the above-described unit in response to a signal of detection of a defective grain or the like to eject air to blow off the defective grain when the grain is falling from an end part of a conveyor path along a predetermined trajectory.

The particulate matter sorter ejects air to blow off defective grains or the like in a large amount of grains continuously falling. To precisely blow off the defective grains or the like without blowing off the other grains, the air ejecting nozzle has to have a valve with a high responsivity.

In Patent Document 1, a piezoelectric air valve is described that uses a piezoelectric element to quickly open and close the valve. The piezoelectric air valve is provided with a displacement enlarging mechanism that enlarges a small displacement of the piezoelectric element by the principle of leverage.

The piezoelectric air valve has a higher responsivity at the time of opening and closing of the valve than the conventional electromagnetic valve, and therefore, the optical particulate matter sorter provided with the air ejecting nozzle incorporating the piezoelectric air valve can precisely blow off defective grains or the like and is less likely to blow off non-defective grains or the like.

However, since the piezoelectric air valve moves a valve body via the displacement enlarging mechanism, the optical particulate matter sorter has a problem that, in case of long gas ejection time, the valve body vibrates and the amount of air ejected from the nozzle changes, and stable separation cannot be achieved.

In Patent Document 2, a piezoelectric valve is described that applies a two-level driving voltage to a piezoelectric element to prevent the variation of the amount of gas ejected from a gas discharge channel when the valve is opened. The piezoelectric valve applies a first level voltage to the piezoelectric element at the time to drive the valve open, and applies a second level voltage higher than the first level voltage to the piezoelectric element at the time to prevent the vibration of the valve body caused by the valve opening. With such a configuration, the variation of the amount of gas ejected from the gas discharge channel after valve opening can be prevented, so that the gas can be stably supplied even when the gas is ejected for a long time.

However, the piezoelectric valve has a problem that it has a significantly low responsivity at the time of valve opening compared with the case where a single-level rectangular driving voltage is applied to the piezoelectric element.

In addition, the piezoelectric valve has another problem that it is expensive because the driving device has a complicated circuit configuration compared with the case where a single-level driving voltage is applied to the piezoelectric element.

CITATION LIST

Patent Literature

[Patent Document 1] Japanese Patent Laid-Open No. 2004-316835
[Patent Document 2] Japanese Patent Laid-Open No. 2011-241961

SUMMARY OF THE INVENTION

Technical Problem

In view of such circumstances, an object of the present invention is to provide a piezoelectric valve that can stably supplying gas even when the gas is ejected for a long time and has a high responsivity at the time of valve opening, and a method of driving the same piezoelectric valve.

Another object of the present invention is to provide an optical particulate matter sorter that uses the piezoelectric valve described above and can reliably blow off defective grains or the like and achieve stable particulate matter separation.

Solution to Problem

To attain the objects described above, the present invention provides a piezoelectric valve having a gas pressure chamber configured to receive a compressed gas supplied from outside and a gas discharge channel through which the compressed gas is configured to be discharged from the gas pressure chamber, comprising: a valve body is disposed in the gas pressure chamber, configured to open and close the gas discharge channel; a piezoelectric element configured to produce a driving force required to move the valve body as a displacement; a displacement enlarging mechanism configured to enlarge the displacement of the piezoelectric element, that acts on the valve body; and a driving unit having a signal generating unit configured to generate a signal including a pre-pulse, configured to, provide the signal generated by the signal generating unit to a driving circuit as an input signal to apply a driving voltage to the piezoelectric element, make the piezoelectric element expand and drive the valve body open.

According to the present invention, preferably, the driving unit is configured to apply the driving voltage to the piezoelectric element based on the pre-pulse at a time to open the valve body, and apply the driving voltage to the piezoelectric element based on the main pulse at a time to suppress a variation of the amount of gas ejection from the gas discharge channel after the valve body is opened.

The present invention provides an optical particulate matter sorter comprising: a convey unit configured to conveys an object to be separated; an optical detecting unit configured to detect, at a detection position, the object to be separated falling from an end part of the convey unit; and an air ejecting unit disposed below the optical detecting unit, and configured to eject air to blow off the object to be separated based on a result of detection by the optical detecting unit, the air ejecting unit includes any of the piezoelectric valves described above, and the piezoelectric valve is configured to, generate the signal including the pre-pulse and the main pulse by the signal generating unit of the driving unit, make the piezoelectric element expand, and drive the valve body open, based on the result of detection by the optical detecting unit.

The present invention provides a method of driving a piezoelectric valve, the piezoelectric valve having a gas pressure chamber configured to receive a compressed gas supplied from outside and a gas discharge channel through which the compressed gas is configured to be discharged from the gas pressure chamber, and the piezoelectric valve comprising: a valve body disposed in the gas pressure chamber, and configured to open and close the gas discharge channel; a piezoelectric element configured to produce a driving force required to move the valve body as a displacement; a displacement enlarging mechanism configured to enlarge the displacement of the piezoelectric element, that acts on the valve body; and a driving unit configured to cause expansion or compression displacement of the piezoelectric element to drive the valve body open or close, and, the driving unit having a signal generating unit configured to generate a signal including a pre-pulse and a main pulse and apply a driving voltage to the piezoelectric element based on the signal generated by the signal generating unit, make the piezoelectric element expand and drive the valve body to open.

According to the present invention, the driving unit is configured to apply a voltage to the piezoelectric element based on the pre-pulse to open the valve body, and apply a voltage to the piezoelectric element based on the main pulse to suppress a variation of the amount of gas ejection from the gas discharge channel after the valve body is opened.

Advantageous Effects of Invention

The piezoelectric valve according to the present invention can stably supply gas even when the gas is ejected for a long time and has a high responsivity at the time of valve opening, since the piezoelectric valve is provided with a driving unit that has a signal generating unit that generates a signal comprising a pre-pulse and a main pulse and provides the signal generated by the signal generating unit to a driving circuit as an input signal to apply a driving voltage to the piezoelectric element to make the piezoelectric element expand, thereby driving the valve body to open.

In addition, the piezoelectric valve according to the present invention is inexpensive compared with the driving voltage applied to the piezoelectric element is a two-level voltage, since the driving unit has a simple circuit configuration because a single-level driving voltage having a certain voltage value is applied to the piezoelectric element in response to the signal generated by the signal generating unit provided to the driving circuit as an input signal.

Since the optical particulate matter sorter according to the present invention is provided with the piezoelectric valve according to the present invention, the optical particulate matter sorter can stably supply air even when the air is ejected for a long time and has a high responsivity at the time of valve opening and therefore can reliably blow off defective grains or the like and achieve stable particulate matter separation.

According to the method of driving a piezoelectric valve according to the present invention, since the driving unit has a signal generating unit that generates a signal comprising a pre-pulse and a main pulse and applies a driving voltage to the piezoelectric element based on the signal generated by the signal generating unit to make the piezoelectric element expand to drive the valve body to open, the piezoelectric valve can stably supply gas even when the gas is ejected for a longer time and has a high responsivity at the time of valve opening.

According to the method of driving a piezoelectric valve according to the present invention, cost can be reduced compared with the driving voltage applied to the piezoelectric element is a two-level voltage, since the driving unit has a simple circuit configuration because a single-level driving voltage having a certain voltage value is applied to the piezoelectric element in response to the signal generated by the signal generating unit.

DETAILED DESCRIPTION OF EMBODIMENTS

An embodiment of the present invention will be described with reference to the drawings.
<Piezoelectric Valve>

Figure 1A:
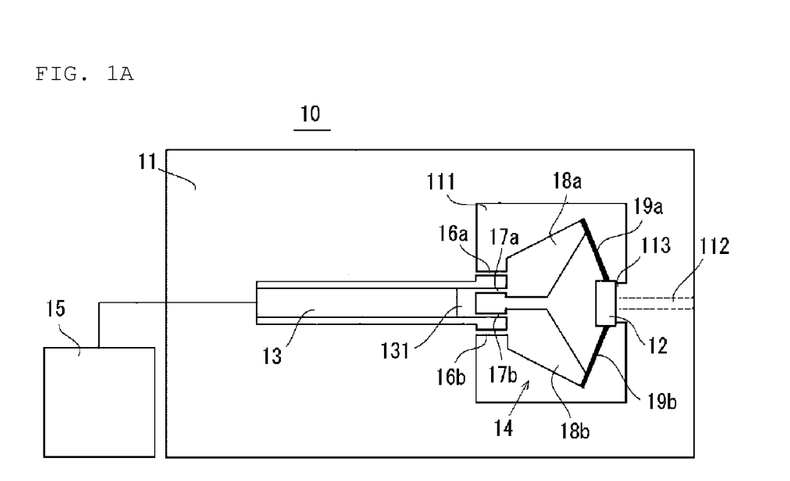
FIG. 1A is a schematic diagram for illustrating a main body of a piezoelectric valve.
Figure 1B:
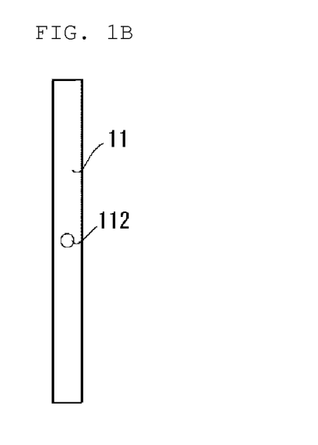
FIG. 1B is a schematic front view of the main body of the piezoelectric valve.

FIG. 1 are schematic diagrams for illustrating a piezoelectric valve with a side of a valve main body opened. FIG. 1A is a side view of the piezoelectric valve opened, and FIG. 1B is a front view of the same.

A piezoelectric valve 10 includes a valve main body 11, a valve body 12, a piezoelectric element 13, displacement enlarging mechanisms 14, and a driving device 15.

The valve main body 11 has a gas pressure chamber 111 that receives a compressed gas supplied from an external compressed gas supply source (not shown), and a gas discharge channel 112 that ejects the gas in the gas pressure chamber 111 to the outside.

The valve body 12 is disposed in the gas pressure chamber 111 in the valve main body 11 and opens and closes the gas discharge channel 112.

The piezoelectric element 13 is disposed in the valve main body 11 and fixed to the valve main body 11 at one end thereof.

The displacement enlarging mechanisms 14 are disposed in the gas pressure chamber 111 in the valve main body 11 and enlarge displacement of the piezoelectric element 13 to act on the valve body 12.

The driving device 15 includes a charging driving circuit that applies a driving voltage to the piezoelectric element 13 to charge the piezoelectric element 13 to make the piezoelectric element 13 expand and a discharging driving circuit that makes the piezoelectric element 13 discharge, to make the piezoelectric element compress. The driving device 15 opens and closes the valve body 12 by making the piezoelectric element 13 expand and compress.

The driving device 15 may be any driving device in which the charging driving circuit and the discharging driving circuit are electrically connected to the piezoelectric element, and does not always have to be physically integrated with the valve main body 11, for example.

The displacement enlarging mechanisms 14 are a pair of displacement enlarging mechanisms 14 that are disposed symmetrically with respect to a line that connects the longitudinal axis of the piezoelectric element 13 and the gas discharge channel 112 (referred to as a center line, hereinafter).

A first displacement enlarging mechanism comprises a first hinge 16a, second hinge 17a, a first arm member 18a and a first leaf spring 19a. The first hinge 16a is coupled to the valve main body 11 at one end thereof. The second hinge 17a is coupled to a cap member 131 attached to the piezoelectric element 13 at one end thereof. The first hinge 16a and the second hinge 17a are coupled to a base part of the first arm member 18a at the respective other ends thereof. The first leaf spring 19a is coupled to an outer tip end part of the first arm member 18a at one end thereof, and the first leaf spring 19a is coupled to one side end part of the valve body 12 at an inner end thereof.

A second displacement enlarging mechanism comprises a third hinge 16b, a fourth hinge 17b, a second arm member 18b and a second leaf spring 19b. The third hinge 16b is coupled to the valve main body 11 at one end thereof. The fourth hinge 17b is coupled to the cap member 131 attached to the piezoelectric element 13 at one end thereof. The third hinge 16b and the fourth hinge 17b are coupled to a base part of the second arm member 18b at the respective other ends thereof. The second leaf spring 19b is coupled to an outer tip end part of the second arm member 18b at one end thereof, and the second leaf spring 19b is coupled to the other side end part of the valve body 12 at an inner end thereof.

With the piezoelectric valve 10 in the state shown in FIG. 1A, when the driving device 15 applies a driving voltage to the piezoelectric element 13 to charge the piezoelectric element 13, the piezoelectric element 13 expands in the rightward direction in the drawing. The first displacement enlarging mechanism enlarges the expansion displacement of the piezoelectric element 13 by the principle of leverage with the second hinge 17a serving as a point of power, the first hinge 16a serving as a fulcrum, and the tip end part of the first arm member 18a serving as a point of action, thereby substantially displacing the outer tip end part of the first arm member 18a. Similarly, the second displacement enlarging mechanism enlarges the expansion displacement of the piezoelectric element 13 by the principle of leverage with the fourth hinge 17b serving as a point of power, the third hinge 16b serving as a fulcrum, and the tip end part of the second arm member 18b serving as a point of action, thereby substantially displacing the outer tip end part of the second arm member 18b.

The displacements of the outer tip end parts of the first arm member 18a and the second arm member 18b cause the valve body 12 to separate from a valve seat 113 via the first leaf spring 19a and the second leaf spring 19b, thereby opening the gas discharge channel 112.

On the other hand, in the piezoelectric valve 10, when the driving device 15 make the piezoelectric element 13 discharge, the piezoelectric element 13 compresses, the compression is transferred to the valve body 12 via the first and second displacement enlarging mechanisms, and the valve body 12 rests on the valve seat 113.

The piezoelectric valve 10 in the state where a side of the gas pressure chamber 111 is open to the outside has been described with reference to FIG. 1. Of course, however, this description is intended only to illustrate the internal structure, and the gas pressure chamber 111 can be used in a closed state.

<First Modification of Piezoelectric Valve>

Figure 2:
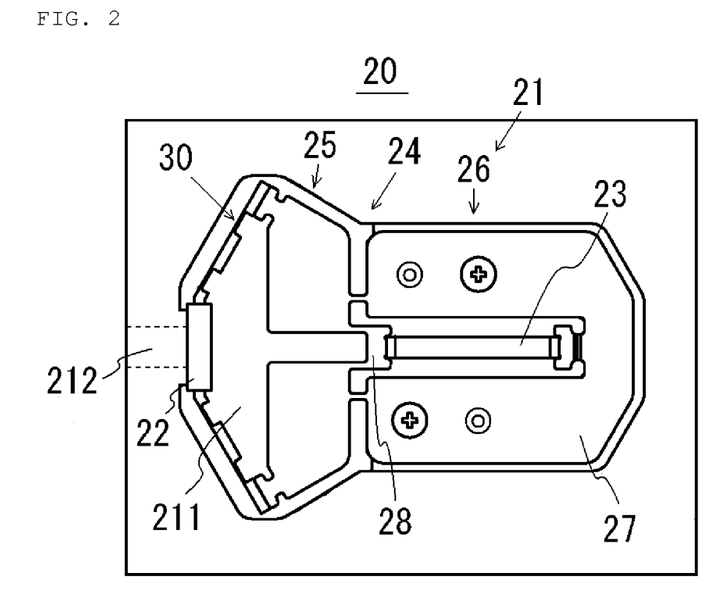
FIG. 2 is a diagram showing a first modification of the piezoelectric valve.

FIG. 2 shows a first modification of the piezoelectric valve in a state where a side of the valve main body is opened.

A piezoelectric valve 20 has an actuator 30 that comprises a valve body 22, a piezoelectric element 23 and a displacement enlarging mechanism 24 integrated with each other. The piezoelectric valve 20 differs from the piezoelectric valve 10 shown in FIG. 1 in that the actuator 30 is fixed to a valve main body 21 having a gas pressure chamber 211 and a gas discharge channel 212 at a side thereof Note that illustration of a driving device that opens and closes the valve body 22 (which is equivalent to the driving device 15 described above) is omitted in FIG. 2.

The displacement enlarging mechanism 24 has a displacement enlarging unit 25 that enlarges displacement of the piezoelectric element 23 and a displacement transferring unit 26 that transfers the displacement of the piezoelectric element 23 to the displacement enlarging unit 25.

The displacement transferring unit 26 has a U-shaped base substrate 27 to which the piezoelectric element 23 is coupled at one end thereof, and a cap member 28 to which the piezoelectric element 23 is coupled at the other end thereof.

In the piezoelectric valve 20, the piezoelectric element 23 is disposed in the space inside the U-shaped base substrate 27 between the bottom of the U-shaped base substrate 27 and the cap member 28 and coupled to the base substrate 27 at the one end thereof and to the cap member 28 at the other end thereof.

Of course, the piezoelectric valve 20 can also be used in the state where a side of the valve main body 21 is closed.

<Second Modification of Piezoelectric Valve>

Figure 3:
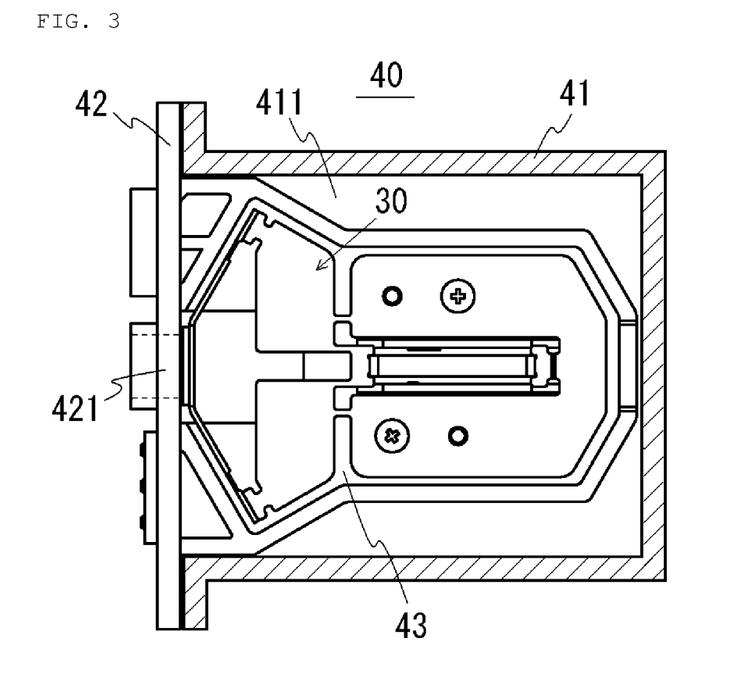
FIG. 3 is a diagram showing a second modification of the piezoelectric valve.

FIG. 3 is a cross-sectional view showing the interior of a valve body of a second modification of the piezoelectric valve.

A piezoelectric valve 40 shown in FIG. 3 differs from the piezoelectric valve 20 shown in FIG. 2 in that a valve main body 41 defining a gas pressure chamber 411 is open at a front side thereof, a gas discharge channel 421 is formed in a lid body 42 that closes the opening, the lid body 42 is integrated with a plate 43 that is disposed in the valve main body 41, and the actuator 30 shown in FIG. 2 is fixed to the plate 43.

Note that illustration of a driving device that opens and closes the valve body is also omitted in FIG. 3.

The piezoelectric valve 40 is assembled by placing the plate 43 with the actuator 30 fixed thereto in the valve main body 41 through the opening at the front side of the valve main body 41, and the opening of the valve main body 41 is closed by the lid body 42 integrated with the plate 43.

EXAMPLE

Pre-Pulse Signal

Figure 4A:
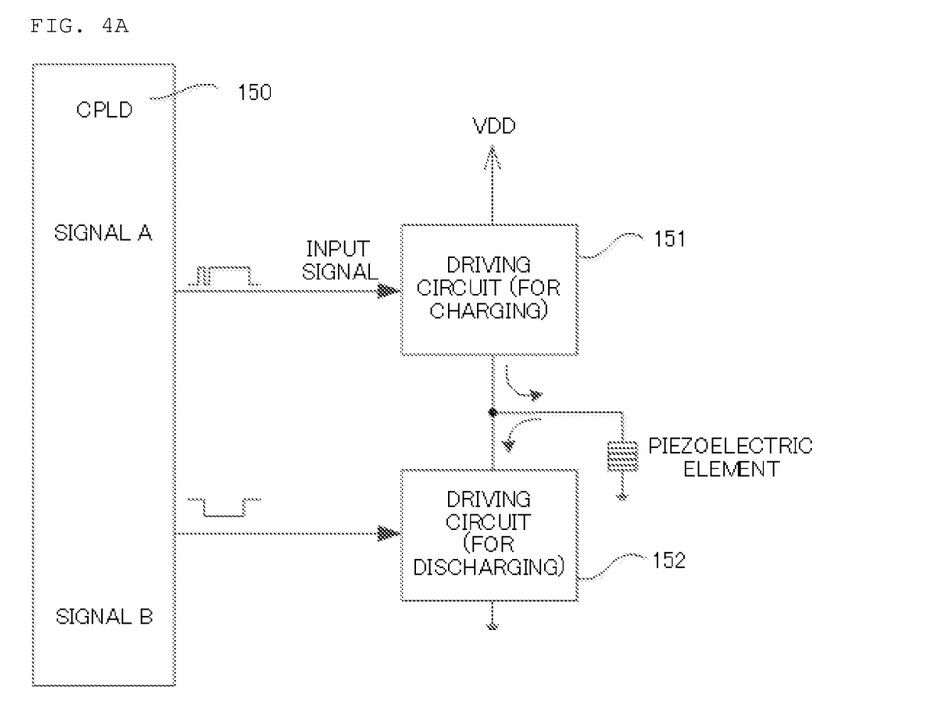
FIG. 4A is a block diagram showing a circuit configuration of a driving device of the piezoelectric valve according to the present invention.
Figure 4B:
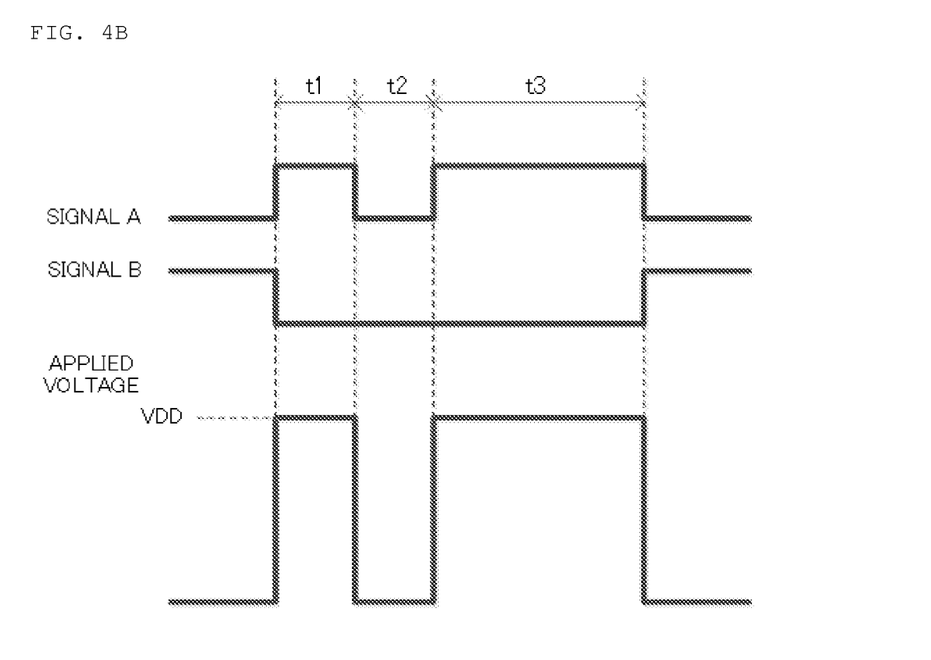
FIG. 4B is a diagram showing input signals and an applied voltage to the piezoelectric valve according to the present invention.

FIG. 4A is a block diagram showing a circuit configuration of the driving device of the piezoelectric valve according to the present invention, and FIG. 4B is a timing chart of signals that occur in the circuit and a voltage applied to the piezoelectric element.

As shown in FIG. 4A, the driving device of the piezoelectric valve according to the present invention applies a voltage to the piezoelectric element to charge the piezoelectric element to make the piezoelectric element expand by a signal generating unit 150 generating a charging signal A that comprises a pre-pulse and a main pulse (referred to as a pre-pulse signal hereinafter) and providing the pre-pulse signal to a charging driving circuit 151 as an input signal. The driving device make the piezoelectric element discharge to make the piezoelectric element compress by the signal generating unit 150 generating a discharging signal B and providing the discharging signal B to a discharging driving circuit 152.

As shown in FIG. 4B, the signal A (pre-pulse signal) generated by the signal generating unit 150 is provided to the charging driving circuit 151 as an input signal, and a single-level driving voltage having a certain voltage value is applied to the piezoelectric element, so that the driving device of the piezoelectric valve according to the present invention has a simple circuit configuration.

Figure 5A:
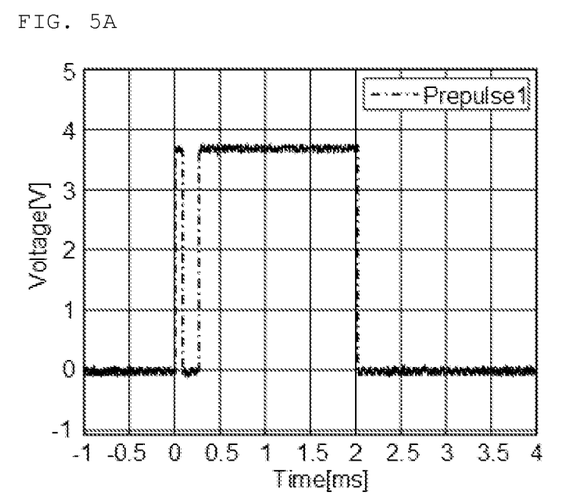
FIG. 5A is a graph showing an input signal to a charging driving circuit in an example of the present invention.
Figure 5B:
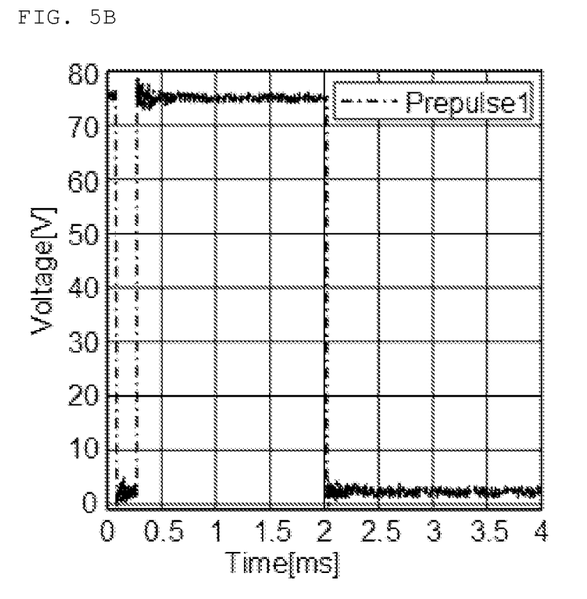
FIG. 5B is a graph showing a driving voltage applied to a piezoelectric element in the example of the present invention.
Figure 5C:
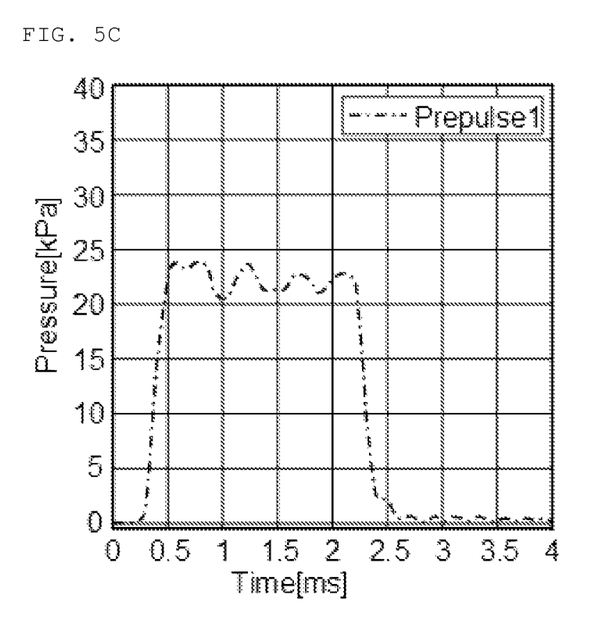
FIG. 5C is a graph showing ejection pressure characteristics of air ejected from a gas discharge channel in the example of the present invention.

FIG. 5A is a graph showing the input signal (pre-pulse signal) to the charging driving circuit 151 of the piezoelectric valve according to the present invention, FIG. 5B is a graph showing the driving voltage applied to the piezoelectric element based on the input signal, and FIG. 5C is a graph showing ejection pressure characteristics of air ejected from the gas discharge channel whose valve is opened in response to the driving voltage. In this example, compressed air was used as the compressed gas supplied to the piezoelectric valve from outside.

Conditions of the experiment shown in the graphs of FIGS. 5A to 5C are as follows.

(1) Supply pressure of compressed air: 0.25 MPa (gage pressure value under atmospheric pressure)
(2) Preset flow rate of compressed air: 60 L/min
(3) Input signal: pre-pulse duration t1=0.14 ms, quiescent period t2=0.03 ms, and main pulse duration t3=1.83 ms (energization time of piezoelectric element: 2 ms)
(4) Position of detection of air ejection pressure: 2 mm from tip end of gas discharge channel The pre-pulse duration t1, the quiescent period t2 (the time to input the main pulse), and the value of the driving voltage applied to the piezoelectric element in response to the pre-pulse signal are set by previously experimentally or otherwise determining optimal timing conditions or the like under which the air ejection pressure quickly rises when the valve is opened and is prevented from varying after the valve is opened (the valve body is prevented from vibrating in reaction to the valve opening).

The main pulse duration t3 is set based on the air ejection period.

COMPARATIVE EXAMPLE

Two-Level Signal

Figure 6A:
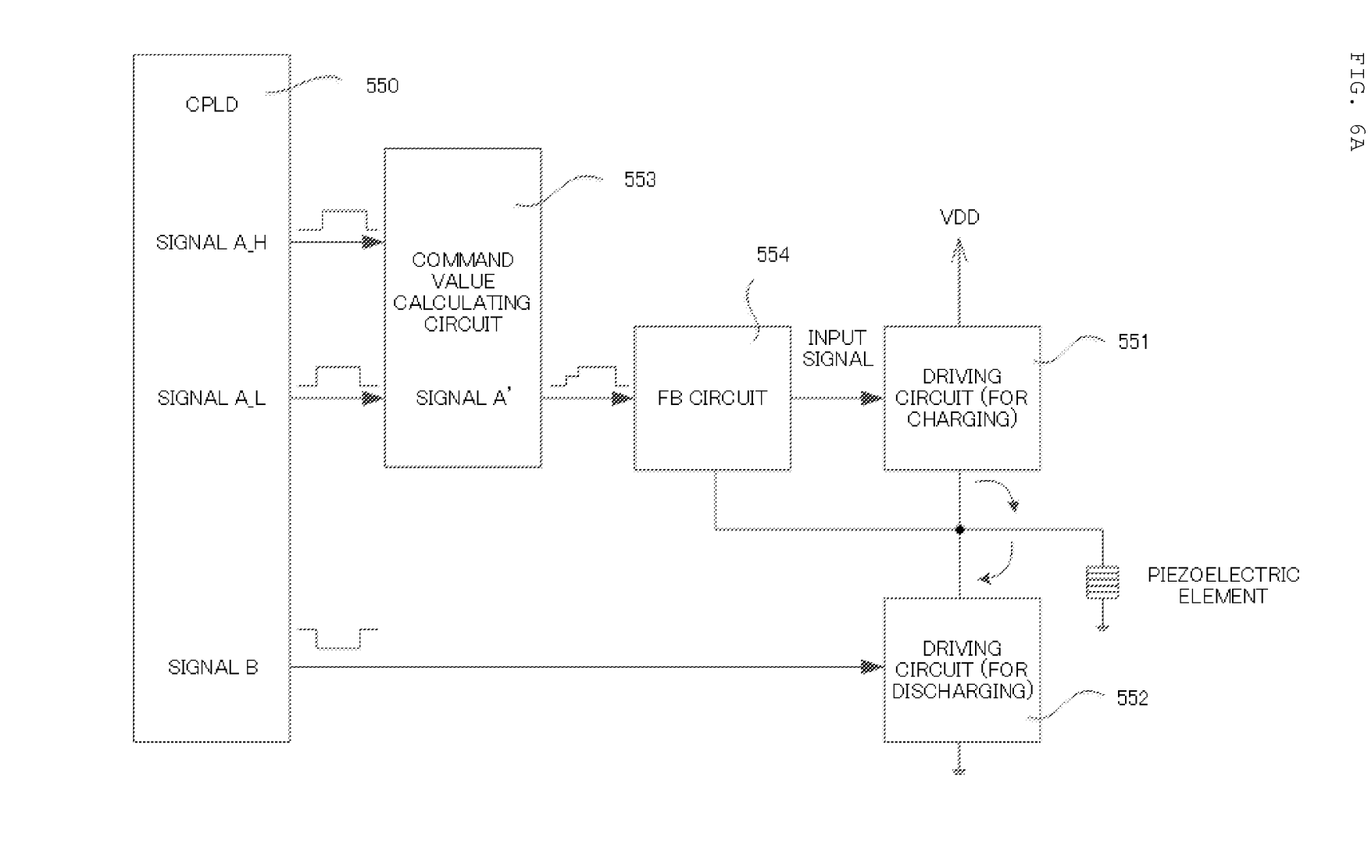
FIG. 6A is a block diagram showing a circuit configuration of a driving device of a conventional piezoelectric valve.
Figure 6B:
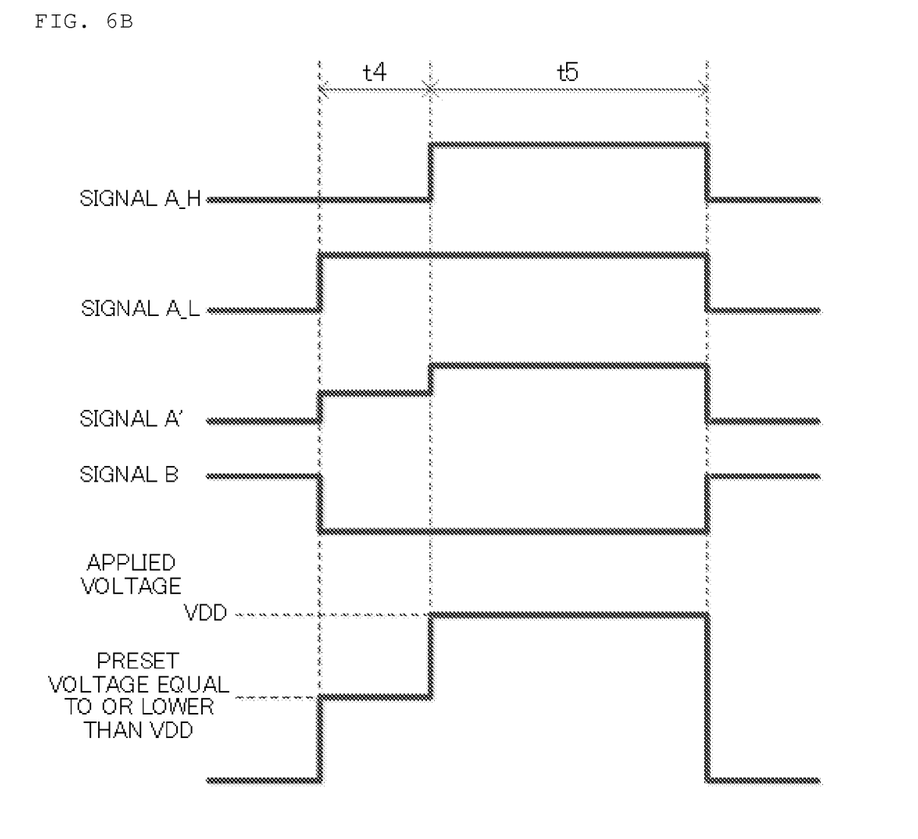
FIG. 6B is a diagram showing input signals and an applied voltage to the conventional piezoelectric valve.

FIG. 6A is a block diagram showing a circuit configuration of a driving device of a conventional piezoelectric valve described in Patent Document 2, and FIG. 6B is a timing chart of signals that occur or are generated in the circuit and a voltage applied to a piezoelectric element.

As shown in FIG. 6A, the driving device of the conventional piezoelectric valve applies a voltage to the piezoelectric element to charge the piezoelectric element to make the piezoelectric element expand by a signal generating unit 550 generating two charging rectangular wave signals A_H and A_L and a command value calculating circuit 553 combining the two signals to generate a composite two-level signal A' (referred to as a two-level signal hereinafter) and providing the two-level signal to a charging driving circuit 551 as an input signal. The driving device makes the piezoelectric element discharge to make the piezoelectric element compress by the signal generating unit 550 generating a discharging signal B and providing the discharging signal B to a discharging driving circuit 552.

As shown in FIG. 6B, the conventional piezoelectric valve is configured so that the command valve calculating circuit 553 generates the signal A' (two-level signal) based on the signals A_H and A_L generated by the signal generating unit 550, and the signal A' (two-level) is provided to the charging driving circuit 551 as an input signal to apply a two-level driving voltage to the piezoelectric element. An FB circuit 554 is required to conduct feedback control to set a first level of the driving voltage applied to the piezoelectric element at a target value, so that the driving device has a complicated circuit configuration.

Figure 7A:
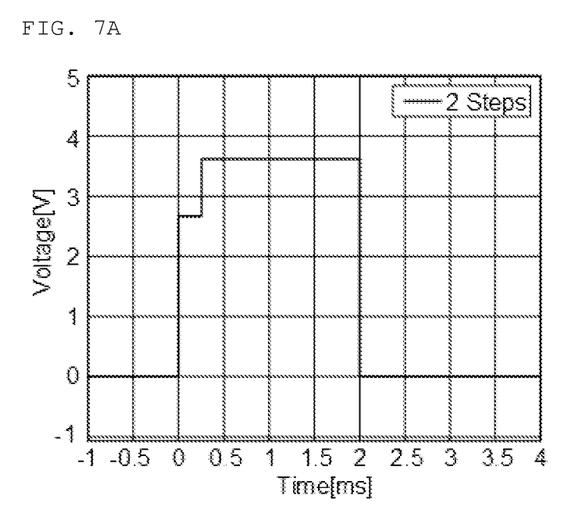
FIG. 7A is a graph showing an input signal to a charging driving circuit in a comparative example.
Figure 7B:
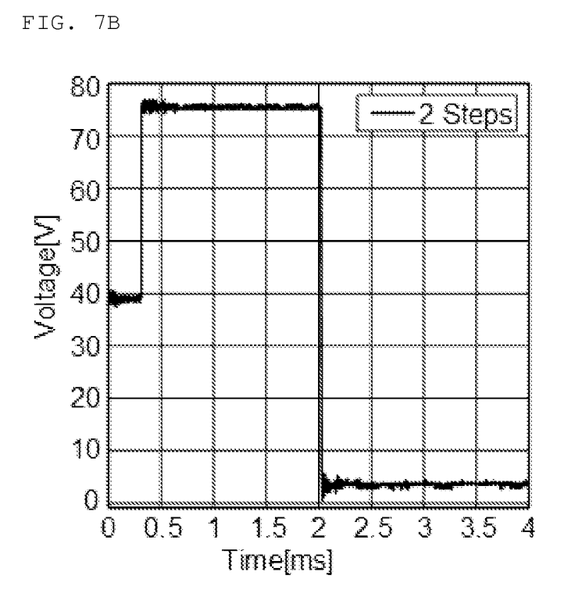
FIG. 7B is a graph showing a driving voltage applied to a piezoelectric element in the comparative example.
Figure 7C:
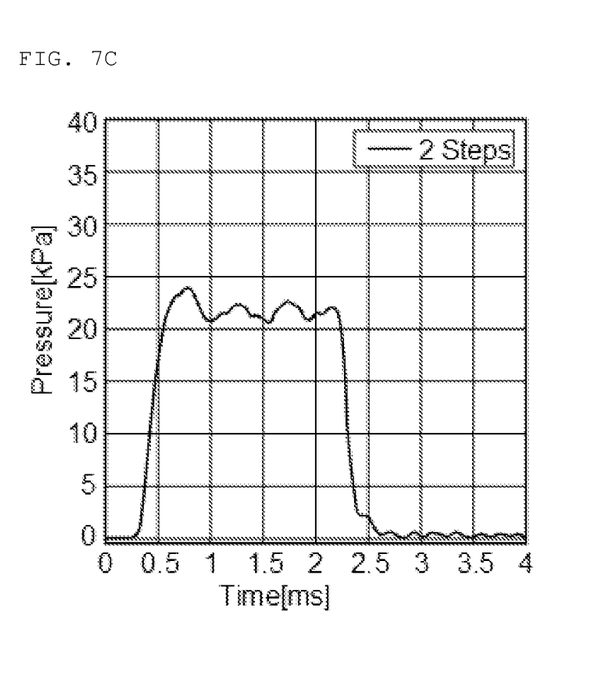
FIG. 7C is a graph showing ejection pressure characteristics of air ejected from a gas discharge channel in the comparative example.

FIG. 7A is a graph showing the input signal (two-level signal) to the charging driving circuit 551 of the conventional piezoelectric valve (according to the comparative example), FIG. 7B is a graph showing the driving voltage applied to the piezoelectric element based on the input signal, and FIG. 7C is a graph showing ejection pressure characteristics of air ejected from the gas discharge channel whose valve is opened in response to the driving voltage. In this example, again, compressed air was used as the compressed gas supplied to the piezoelectric valve from outside.

Conditions of the experiment shown in the graphs of FIGS. 7A to 7C are as follows.

(1) Supply pressure of compressed air: 0.25 MPa (gage pressure value under atmospheric pressure)
(2) Preset flow rate of compressed air: 60 L/min
(3) Input signal: duration t4 of first level signal=0.26 ms, and duration t5 of second level signal=1.74 ms (energization time of piezoelectric element: 2 ms)
(4) Position of detection of air ejection pressure: 2 mm from tip end of gas discharge channel The duration of the first level t4 (the time to input the second level signal) and the value of the driving voltage applied to the piezoelectric element in response to the two-level signal are set by previously experimentally or otherwise determining optimal timing conditions or the like under which the air ejection pressure quickly rises when the valve is opened and is prevented from varying after the valve is opened (the valve body is prevented from vibrating in reaction to the valve opening).

The duration t5 of the second level signal is set based on the air ejection period.

Figure 8:
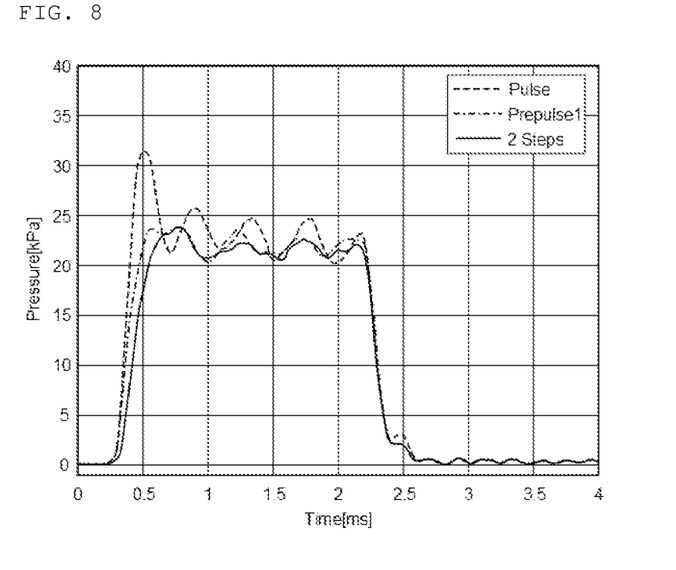
FIG. 8 is a graph showing air ejection pressure characteristics in the example of the present invention and the comparative example for comparison.

FIG. 8 is a graph showing the air ejection characteristics in the example and the comparative example for comparison.

In FIG. 8, the alternate long and short dash line indicates a case where the pre-pulse signal is provided to the charging driving circuit 151 as an input signal. The solid line indicates a case where the two-level signal is provided to the charging driving circuit 551 as an input signal. In addition, in FIG. 8, a dashed line indicates a case where the pulse (rectangular wave) signal is provided to the charging driving circuit as an input signal. In the case where the pulse signal is provided to the charging driving circuit as an input signal, a single-level rectangular driving voltage is applied to the piezoelectric element.

As can be seen from the graph, with the piezoelectric valve in which the pulse signal is provided as an input signal, the responsivity at the time of valve opening is extremely high, whereas the air ejection pressure (amount) significantly varies after the valve is opened.

As can also be seen from the graph, with the conventional piezoelectric valve in which the two-level signal is provided as an input signal, the variation of the air ejection pressure (amount) after the valve is opened is reduced but the responsivity at the time of valve opening is significantly low compared with the case where the pulse signal is provided as an input signal described above.

With the piezoelectric valve according to the present invention in which the pre-pulse signal is provided as an input signal, the variation of the air ejection pressure (amount) after the valve is opened is reduced compared with the case where the pulse signal is provided as an input signal described above, and the responsivity at the time of valve opening is high compared with the case where the two-level signal is provided as an input signal described above.

From the above description, it can be concluded that the piezoelectric valve according to the present invention can stably supply the gas even when the gas is continuously ejected for a long time, and has a high responsivity at the time of valve opening.

<Optical Particulate Matter Sorter>

Next, an optical particulate matter sorter provided with a gas ejecting nozzle incorporating the piezoelectric valve according to the present invention will be described.

Figure 9:
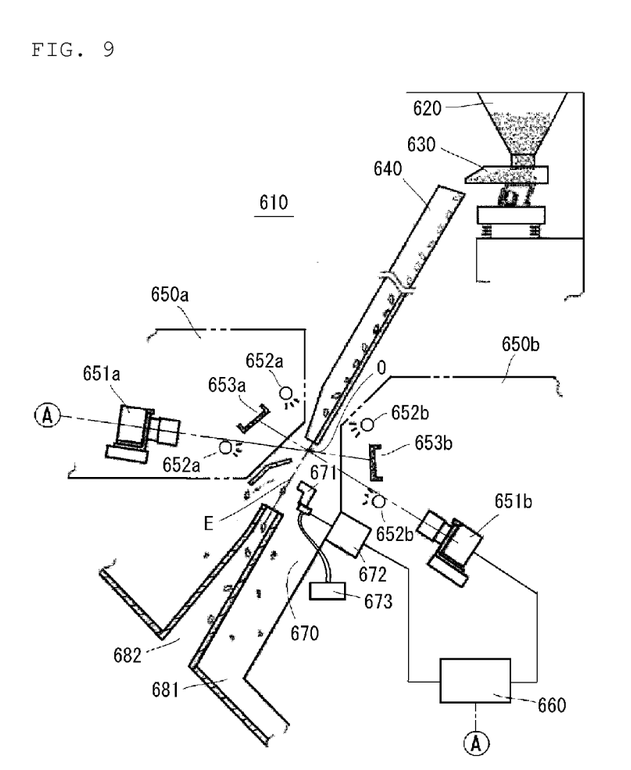
FIG. 9 is a side cross-sectional view of essential parts of an optical particulate matter sorter.
Figure 10:
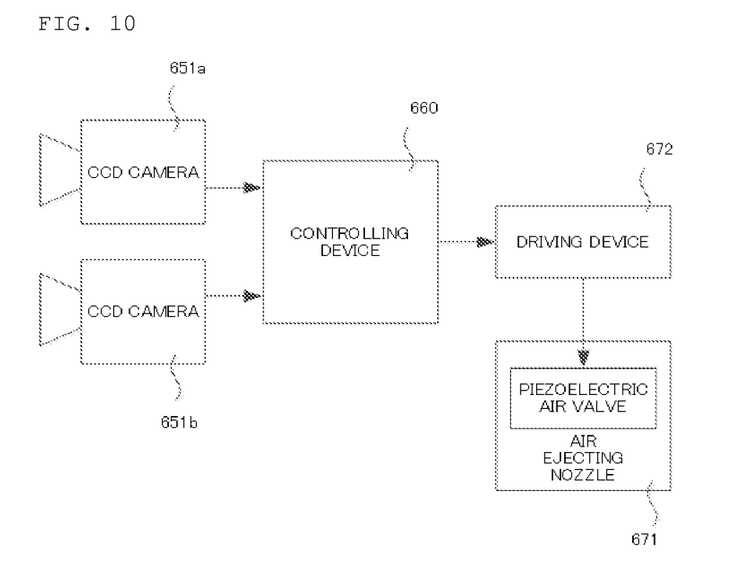
FIG. 10 is a block diagram for illustrating control of the particulate matter sorter shown in FIG. 9.

FIG. 9 is a side cross-sectional view of essential parts of an optical particulate matter sorter, showing an internal structure of the optical particulate matter sorter in a simplified manner. FIG. 10 is a block diagram for illustrating control of the optical particulate matter sorter.

An optical particulate matter sorter 610 has a grain supply unit at the top thereof and the grain supply unit comprises a tank 620 and a vibrating feeder 630. An inclined chute 640 having a predetermined width is disposed below the grain supply unit.

Grains supplied from the grain supply unit are spread over the entire width of the inclined chute 640 and continuously flow down by gravity along the inclined chute 640, and then are thrown into the air in a predetermined falling trajectory from the lower end of the inclined chute 640.

At least a pair of optical detecting devices 650a and 650b are disposed in front of and behind the predetermined falling trajectory so as to face each other. The optical detecting devices 650a and 650b take image of the grains at a grain detection position O that linearly extends in parallel with the width direction of the inclined chute 640. The optical detecting devices 650a and 650b comprise imaging units 651a and 651b, such as a CCD camera incorporating a CCD line sensor, illuminating units 652a and 652b, such as a fluorescent lamp, and backgrounds 653a and 653b that serve as a background of the grains being imaged, respectively, for example.

An air ejecting device 670 that ejects air to remove a defective grain or the like is disposed below the grain detection position O. The air ejecting device 670 comprises an air ejecting nozzle 671 including an assembly of a plurality of piezoelectric valves according to the present invention described above arranged in parallel with each other and a compressed air supplying device 673 that supplies compressed air to the air ejecting nozzle 671. Based on the detection result from the optical detecting devices 650a and 650b, the air ejecting device 670 blows off the grains thrown from the lower end of the inclined chute 640 with the air ejected from the plurality of nozzle holes of the air ejecting nozzle 671 arranged in association with the positions of the falling trajectories of the grains in the width direction. The piezoelectric element of the piezoelectric valve is electrically connected to a driving circuit of a driving device 672.

In the optical particulate matter sorter 610 described above, the grains that have continuously flowed down by gravity along the inclined chute 640, spread over the entire width thereof, and then been thrown into the air in a predetermined falling trajectory from the lower end of the inclined chute 640 are imaged at the grain detection position O by the imaging unit 651a and 651b of the optical detecting devices 650a and 650b, and the resulting imaging data is transmitted to a controlling device 660. The controlling device 660 determines a grain to be removed, such as a defective grain, based on the imaging data, acquires information concerning the size of the grain or the like from the imaging data, and transmits a signal for removal of the defective grain or the like to the driving device 672.

Based on the signal for removal transmitted to the driving device 672, the air ejecting device 670 selectively drives one or more of the plurality of piezoelectric valves to eject air to the defective grains or the like that pass through a grain removal position E that linearly extends in parallel with the width direction of the inclined chute 640 from the nozzle holes of the air ejecting nozzle 671 driven in association with the positions of the defective grains in the width direction.

To achieve this, the driving device 672 operates by the signal generating unit generating the pre-pulse signal based on the signal for removal and providing the pre-pulse signal to the charging driving circuit as an input signal to apply the piezoelectric element of the one or more piezoelectric valve selectively driven, as shown in FIG. 4.

The pre-pulse duration t1 and the quiescent period t2 (time to input the main pulse) of the pre-pulse signal are previously experimentally or otherwise determined and set in the driving device 672.

The defective grains or the like blown off by the air ejected from the nozzle holes of the air ejecting nozzle 671 are discharged to the outside through a defective grain discharge port 681. The non-defective grains or the like that have passed in the predetermined falling trajectory without being blown off the ejected air are collected through a non-defective grain discharge port 682.

As described above, the optical particulate matter sorter 610 described above can stably separate grains because the piezoelectric valve has a high responsivity at the time of valve opening, and air can be stably supplied to reliably blow off defective grains or the like even when the air is ejected for a long time.

Particulate matters to be separated by the optical particulate matter sorter are typically grains, in particular, rice grains. However, the optical particulate matter sorter is not exclusively applied to such grains but can be applied to any particulate matters having a size and weight that can be blown off by the ejected air.

The displacement enlarging mechanisms of the piezoelectric valve according to the present invention may be disposed asymmetrically with respect to the line that connects the longitudinal axis of the piezoelectric element and the gas discharge channel, or the piezoelectric valve according to the present invention may include only one displacement enlarging mechanism.

The valve body of the piezoelectric valve according to the present invention may be coupled to one end parts of the arm members.

The longitudinal axis of the piezoelectric element of the piezoelectric valve according to the present invention may not be aligned with the direction of movement of the valve body.

The present invention is not limited to the embodiment described above, and the configurations described above can be modified as required without departing from the scope of the present invention.

INDUSTRIAL APPLICABILITY

The piezoelectric valve according to the present invention can stably supply gas even when the gas is ejected for a long time and has a high responsivity at the time of the valve opening, and therefore has various applications.

REFERENCE SIGNS LIST 10 piezoelectric valve
11 valve main body
111 gas pressure chamber
112 gas discharge channel
12 valve body
13 piezoelectric element
14 displacement enlarging mechanism
15 driving device
150 signal generating unit
151 charging driving circuit
152 discharging driving circuit
18a, 18b arm member
19a, 19b leaf spring
20 piezoelectric valve
21 valve main body
211 gas pressure chamber
212 gas discharge channel
22 valve body
23 piezoelectric element
24 displacement enlarging mechanism
30 actuator
40 piezoelectric valve
41 valve main body
411 gas pressure chamber
42 lid body
421 gas discharge channel
43 plate
55 driving device
550 signal generating unit
551 charging driving circuit
552 discharging driving circuit
553 command valve calculating circuit
554 feedback circuit
610 optical particulate matter sorter
640 inclined chute
650a, 650b optical detecting device
651a, 651b CCD camera (an imaging unit)
660 controlling device
670 air ejecting device
671 air ejecting nozzle
672 driving device
673 compressed air supplying device

What is claimed is:

1. A piezoelectric valve having a gas pressure chamber configured to receive a compressed gas supplied from outside and a gas discharge channel through which the compressed gas is configured to be discharged from the gas pressure chamber, comprising:

a valve body, disposed in the gas pressure chamber, configured to open and close the gas discharge channel;

a piezoelectric element configured to produce a driving force required to move the valve body as a displacement;

a displacement enlarging mechanism configured to enlarge the displacement of the piezoelectric element, that acts on the valve body; and a driving unit, having a signal generating unit configured to generate a signal including a pre-pulse and a main pulse, configured to, provide the signal generated by the signal generating unit to a driving circuit as an input signal to apply a driving voltage to the piezoelectric element, make the piezoelectric element expand and drive the valve body open.

2. The piezoelectric valve according to claim 1, the driving unit is configured to apply the driving voltage to the piezoelectric element based on the pre-pulse at a time to open the valve body, and apply the driving voltage to the piezoelectric element based on the main pulse at a time to suppress a variation in the amount of gas ejection from the gas discharge channel after the valve body is opened.

3. An optical particulate matter sorter, comprising:

a convey unit configured to convey an object to be separated;

an optical detecting unit configured to detect, at a detection position, the object to be separated falling from an end part of the convey unit; and an air ejecting unit, disposed below the optical detecting unit, and configured to eject air to blow off the object to be separated based on a result of detection by the optical detecting unit, and, the air ejecting unit includes the piezoelectric valve according to claim 1, and the piezoelectric valve is configured to, generate the signal including the pre-pulse and the main pulse by the signal generating unit of the driving unit, make the piezoelectric element expand, and drive the valve body open, based on the result of detection by the optical detecting unit.

4. A method of driving a piezoelectric valve, the piezoelectric valve having a gas pressure chamber configured to receive a compressed gas supplied from outside and a gas discharge channel through which the compressed gas is configured to be discharged from the gas pressure chamber, and the piezoelectric valve comprising:

a valve body, disposed in the gas pressure chamber, and configured to open and close the gas discharge channel;

a piezoelectric element configured to produce a driving force required to move the valve body as a displacement;

a displacement enlarging mechanism configured to enlarge the displacement of the piezoelectric element, that acts on the valve body; and a driving unit configured to cause expansion or compression displacement of the piezoelectric element to drive the valve body open or close, and, the driving unit having a signal generating unit, configured to generate a signal including a pre-pulse and a main pulse and configured to apply a driving voltage to the piezoelectric element based on the signal generated by the signal generating unit, make the piezoelectric element expand and drive the valve body open.

5. The method of driving a piezoelectric valve according to claim 4, wherein the driving unit is configured to apply a voltage to the piezoelectric element based on the pre-pulse to open the valve body, and apply a voltage to the piezoelectric element based on the main pulse to suppress a variation of the amount of gas ejection from the gas discharge channel after the valve body is opened.

* * * * *